United States Patent [19]

Iwama

[11] 4,344,325

[45] Aug. 17, 1982

[54] MECHANISM FOR SETTING SLIP AND/OR CAMBER ANGLES IN TIRE TESTING MACHINE

[75] Inventor: Atsuaki Iwama, Kobe, Japan

[73] Assignee: Kobe Steel, Ltd., Kobe, Japan

[21] Appl. No.: 144,885

[22] Filed: Apr. 29, 1980

[30] Foreign Application Priority Data

May 4, 1979 [JP] Japan .................. 54-055117

[51] Int. Cl.$^3$ .......................... G01M 17/02
[52] U.S. Cl. ................................. 73/146
[58] Field of Search ......................... 73/146

[56] References Cited

U.S. PATENT DOCUMENTS 3,797,306  3/1974  Petersen et al. ............. 73/146
4,160,378  7/1979  Himmler .................... 73/146

Primary Examiner—James J. Gill
Attorney, Agent, or Firm—Oblon, Fisher, Spivak, McClelland & Maier

[57] ABSTRACT

A mechanism for setting slip and/or camber angles in a tire testing machine having a rotating wheel to serve as a substitutional road, the angle setting mechanism including: a support shaft adapted to support a tire at the center thereof for contact with the rotating wheel a swingable linkage provided between the tire support shaft and a movable frame of the testing machine and essentially constituted by four trapezoidally connected link levers having a pair of outwardly converging side link levers, an outer link lever having the opposite ends thereof pivotally connected to the outer converging ends of the side link levers and centrally fixed to the inner end of the tire support shaft, and an inner link lever having the opposite ends thereof pivotally connected to the inner ends of the side link levers and fixedly supported on the movable frame of the testing machine; and a mechanism for swinging the outer link lever back and forth in a direction substantially parallel to the surface of the movable frame to the axis of the tire support shaft for tilting the tire support shaft from the center line of the tire.

3 Claims, 6 Drawing Figures

MECHANISM FOR SETTING SLIP AND/OR CAMBER ANGLES IN TIRE TESTING MACHINE

BACKGROUND OF THE INVENTION

1. Field of the Invention

This invention relates to a mechanism for setting slip and/or camber angles in a tire testing machine.

2. Description of the Prior Art

For testing various characteristics of tires, for instance, reliability and durability at high speeds, there have been in use tire testing machines of the type in which a tire to be tested is contacted with a circumferential surface of a rotating wheel acting as a substitutional road, applying a radial load on the tire which is held in straight-forward position. However, tires which are actually mounted on vehicle wheels are imparted with slip angles to the left and right from the travel direction of the vehicle as a result of the steering operation by the driver or with camber angles depending upon the road condition. Therefore, in order to test a tire in conditions akin to actual running condition, a tire testing machine should include a mechanism for turning or tilting the tire being tested in simulation of the slip and camber angles.

In this regard, there have been proposed and in use various tire tilting devices, including the following two types. In the first type, a slip or camber angle is imparted by turning a tire about the center of its tread which is in contact with the rotating wheel or substitutional road. In the other type, a slip or camber angle is imparted by turning a tire about a point which is located at a distance from the center of the tread of the tire being tested. Of these two types of tire tilting devices, the first type which is adapted to effect the turns for the slip and camber angles by rotation about the center of the tread is closer to actual running conditions and more preferable in view of the curvature of limited radius of the substitutional rotating wheel. However, this type of angle setting mechanism usually has an uneconomically large size due to the necessity for turning or tilting the tire about the center of its tread.

On the other hand, the second type angle setting mechanism in which the tire is turned about a point which is located at a certain distance from the center of the tire is more economical as it is smaller in size and simpler in construction. However, the second type has an inherent problem in that the center of the tire tread is deviated along the rotating wheel upon making a turn for the slip angle and application of accurate radial load sometimes becomes difficult due to the adverse effects resulting from deviation along the curvature of the rotating wheel.

SUMMARY OF THE INVENTION

With the foregoing in view, the present invention has as its primary object the provision of an angle setting mechanism for use in a tire testing machine, which mechanism is arranged to provide a turn of slip angle to a tire by rotation about the center of the tire tread and yet which is small-sized and simple in construction.

According to the present invention, there is provided a mechanism for setting slip and/or camber angles in tire testing machine having a rotating wheel serving as a substitutional road, the angle setting mechanism including: a support shaft adapted to support a tire rotatably at the center thereof for contact with the rotating wheel a swingable linkage provided between the tire support shaft and a movable frame of the testing machine and essentially constituted by four trapezoidally connected link levers having a pair of outwardly converging side link levers, an outer link lever having the opposite ends thereof pivotally connected to outer ends of the side link levers and centrally fixed to the inner end of the tire support shaft, and an inner link lever having the opposite ends thereof pivotally connected to the inner ends of the side link levers and fixedly supported on the movable frame of the testing machine; and a mechanism for swinging the outer link lever back and forth in a direction substantially perpendicular to the axis of the tire support shaft for tilting the tire support shaft from the center line of the tire being tested.

According to another aspect of the present invention, a pair of angle setting mechanisms each including the above-mentioned four trapezoidally connected link levers are provided in series and in 90 degrees shifted positions between the tire support shaft and the movable frame of the tire testing machine for providing turns and tilts of slip and camber angles.

According to still another aspect of the present invention, a slip angle setting mechanism consisting of the above-mentioned four trapezoidally connected link levers is combined with a camber angle setting mechanism which is arranged to swing the inner link lever of the slip angle setting mechanism back and forth in a direction perpendicular to the swinging direction of the outer link lever.

The above and other objects, features and advantages of the present invention will become apparent from the following description and appended claims, taken in conjunction with the accompanying drawings which show by way of example preferred embodiments of the invention.

DETAILED DESCRIPTION OF PREFERRED EMBODIMENTS

Figure 1:
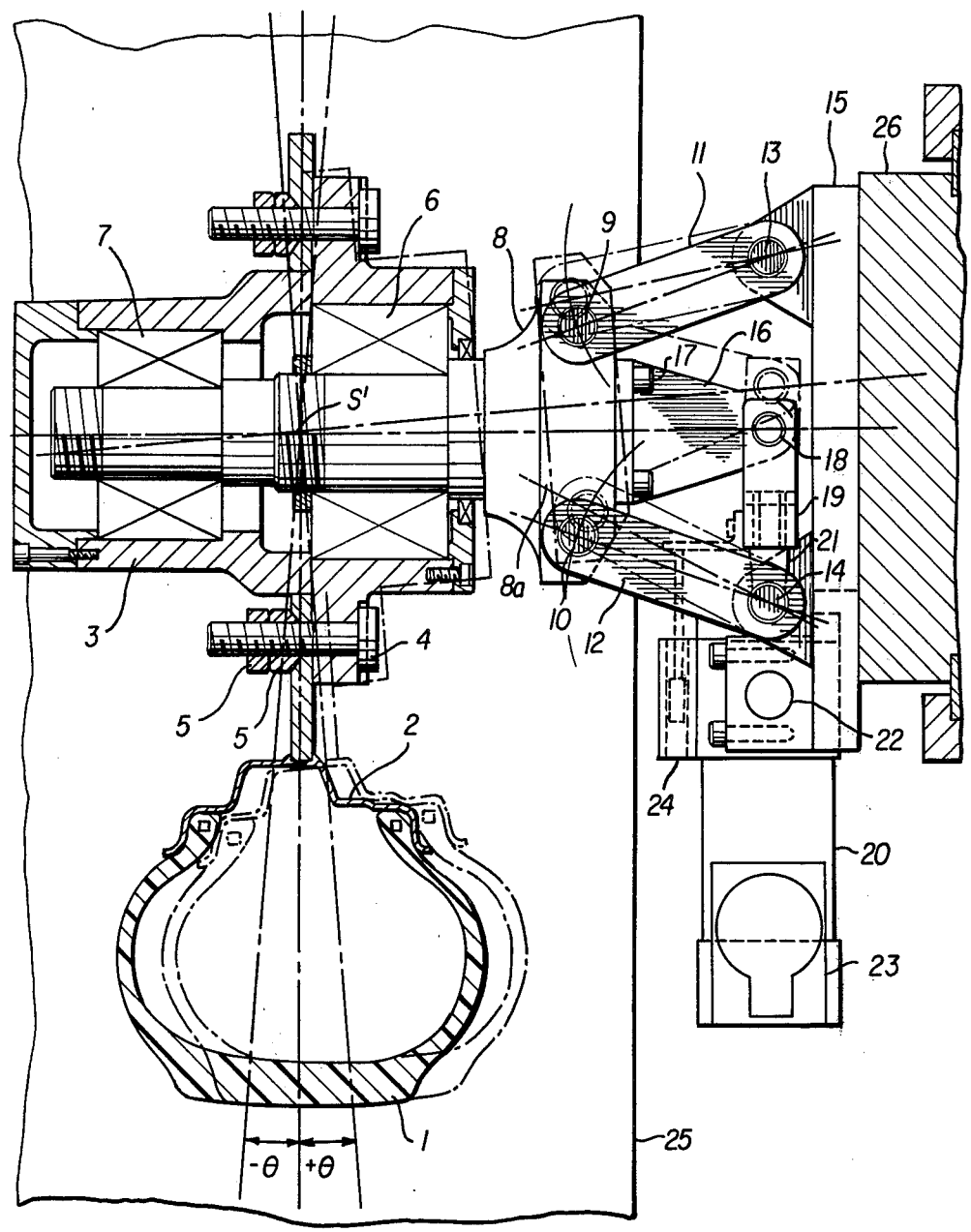
FIG. 1 is a diagrammatic side elevation of a slip angle setting mechanism according to the present invention.
Figure 2:
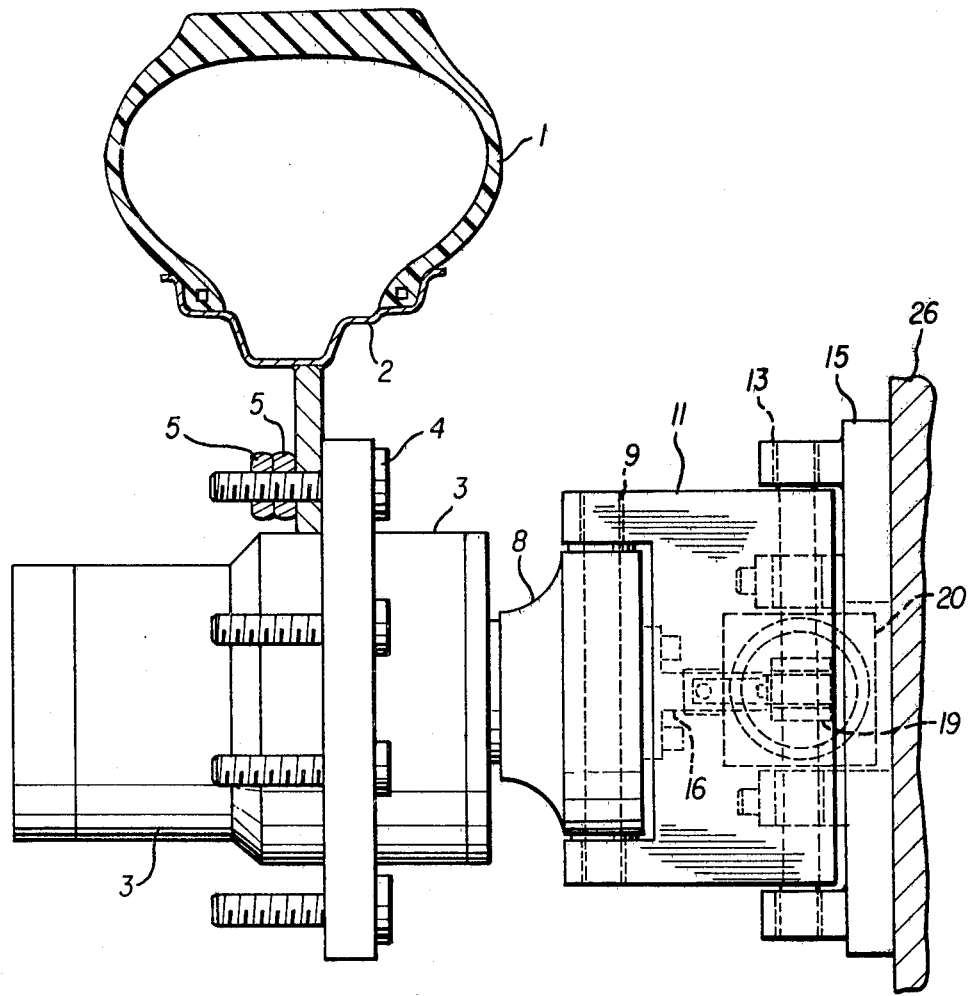
FIG. 2 is a diagrammatic plan view of the mechanism of FIG. 1.

Referring to the accompanying drawings and first to FIGS. 1 and 2, reference numeral 1 denotes a tire to be tested, the tire 1 having the circumferential surface thereof held in contact with a rotating wheel 25 serving as a substitutional road, in a manner well known in the art. The construction of the rotating wheel 25 itself is conventional and thus its illustration is omitted. The tire 1 is mounted on a rim 2 which is securely fixed to a rotatable housing 3 of a substantially cylindrical shape by a number of bolts and nuts 4 and 5. The housing 3 is rotatably supported on a shaft 8 through bearings 6 and 7 which are accommodated within the housing 3.

The tire 1 is thus mounted coaxial with the shaft 8. Provided at the inner end of the tire support shaft 8 is a link lever 8a, an outer one of four trapezoidally connected link levers constituting an angle setting mechanism according to the present invention. The opposite ends of the outer link lever 8a are pivotally connected by pins 9 and 10 to outer ends of obliquely disposed side link levers 11 and 12, respectively. The inner ends of the side link levers 11 and 12, which are of the same length, are similarly pivotally connected by pins 13 and 14 to opposite ends of a seat member 15 which constitutes an inner link lever of the trapezoidally arranged link levers. The seat member 15 is fixedly mounted on a movable frame 26 of the tire testing machine and has a length greater than that of the link lever 8a on the outer side.

An inwardly extending arm 16 is secured to the center portion of the link lever 8a at the inner end of the support shaft 8 by bolts 17. The arm 16 extends in alignment with the axis of the shaft 8 and has its inner or fore end connected to a clevis 19 by a pin 18. The clevis 19 is secured to a rod 21 of a piston-cylinder 20 which moves the clevis 19 back and forth to operate the angle setting mechanism. More particularly, upon moving the rod 21 back and forth by charging and discharging pressurized fluid to and from the piston-cylinder 20, the trapezoidal linkage including the link levers 8a, 11 and 12 is swayed to and fro through the arm 16, teetering the shaft 8 about a center point S' (almost regarded as a single point) coinciding with the center of the tire 1, as shown in phantom. If desired, a servo valve 23 and a position detector 24 may be connected to the piston-cylinder 20 for performing the deflecting operation automatically.

Figure 3:
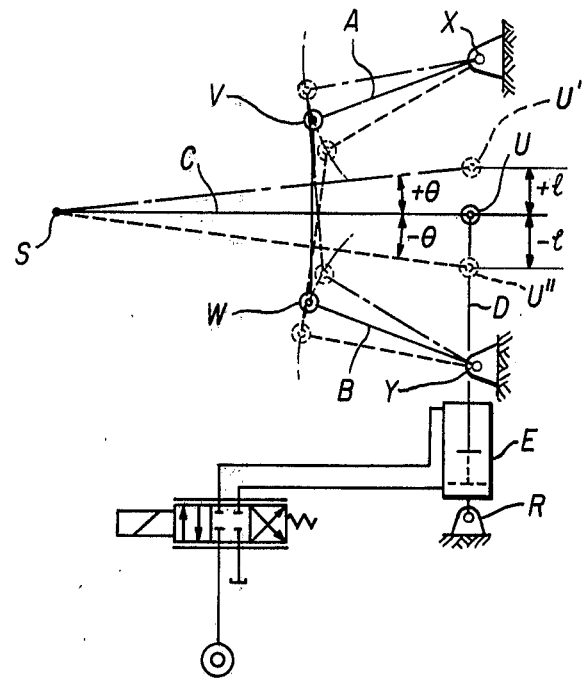
FIG. 3 is a diagrammatic illustration explanatory of the operations of the slip angle setting mechanism.

FIG. 3 illustrates the swinging operation by the outer link lever 8a, side link levers 11 and 12 and seat member 15 which constitute the trapezoidal angle setting mechanism of the invention. In FIG. 3, reference character C represents the support shaft 8, V the pin 9, W the pin 10, A the lever 11, B the lever 12, X the pin 13, Y the pin 14, U the pin 18, E the piston-cylinder 20, and D the rod 21. In this instance, the links A and B have the same length and the distance between pins V and W is shorter than the distance between pins X and Y. Therefore, if the rod D is moved in and out by operating the piston cylinder E, the pin U is moved between U' and U'' and the shaft 8 is oscillated by angles $+\theta$ and $-\theta$ according to the positive and negative strokes $+1$ and $-1$ of the rod D. As a result, the tire which is supported on the shaft 8 is imparted with a slip angle within the range limited by the angles $+\theta$ and $-\theta$. Strictly speaking, the center S of the tire is slightly deviated by the oscillation of the shaft C, without being held at a fixed point. However, the deviation of the center point is extremely small so that actually no trouble occurs even if the tire 1 of FIG. 1 is turned about its center S'. In FIG. 1, the tire in a straight-ahead position is indicated by a solid line figure and the tire in a tilted position is indicated by broken line figure.

Figure 5:
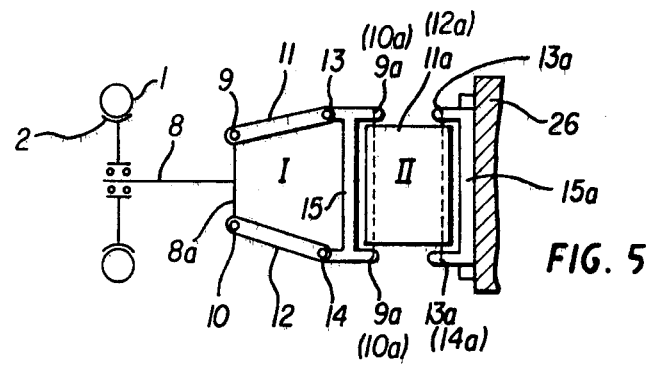
FIG. 5 is a diagrammatic view showing another embodiment of the invention.

FIG. 5 illustrates an embodiment which is provided with a camber angle setting mechanism in addition to the slip angle setting mechanism of FIGS. 1 and 2, for tilting the tire to and from two axes which are disposed perpendicular to each other. In this embodiment, a pair of angle setting mechanisms each consisting of the trapezoidal swinging linkage of FIGS. 1 and 2 are provided in series and in 90° shifted positions between the inner end of the tire support shaft and the movable frame of the tire testing machine. More particularly, the inner end of the tire support shaft 8 is connected to a first angle setting mechanism I consisting of an outer link lever 8a, side link levers 11 and 12 and an inner link lever or seat member 15. The seat member 15 of the first angle setting mechanism I serves as an outer link lever for the second angle setting mechanism II and has its opposite ends pivotally connected to outer ends of second side link levers 11a and 12a by pins 9a and 10a, respectively. The inner ends of the second side link levers 11a and 12a are pivotally connected to a second seat member 15a.

Figure 6:
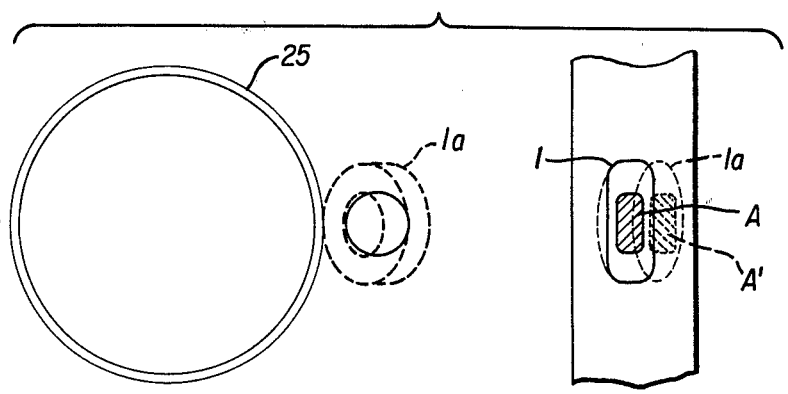
FIG. 6 is a diagrammatic illustration showing the positional relation between a tire imparted with a camber angle and a rotating wheel.
Figure 6:
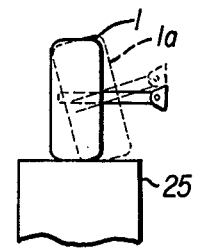
Figure 4:
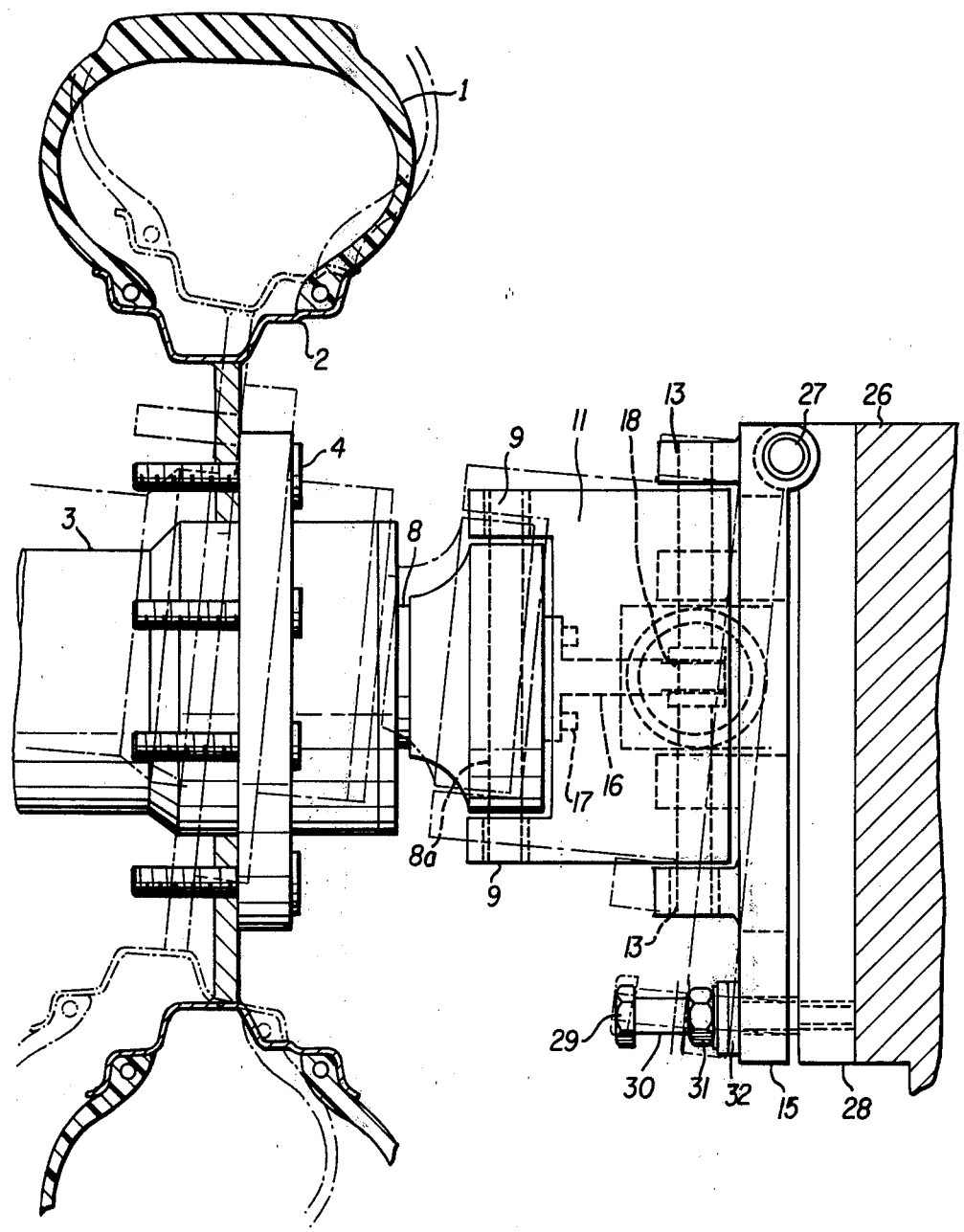
FIG. 4 is a diagrammatic plan view of an embodiment additionally having a camber angle setting mechanism.

By the swinging operation of the second angle setting mechanism II, the tire 1 in straight-ahead position is tilted to assume a camber angle as indicated in a broken line at 1a of FIG. 6. In this instance, the tire is rotated about a point which is distant from the center of the tire tread and the center tread portion A is deviated in the axial direction of the rotating wheel 25 as indicated at A'. This deviation of the center tread portion A, which is not in the direction of the connection, produces no adverse effects especially in relation with the curvature of the rotating wheel 25. When tilting the tire at a certain camber angle, the tire may not necessarily be turned about the center of its tread portion and may be turned about an axis which is located at a distance from the center tread portion. The rotation about a distant axis can be realized by a simpler mechanism as shown in the embodiment of FIG. 4. In this embodiment, the opposite ends of the side link levers 11 and 12 (the side link lever 12 is located behind the other side link lever 11 in the plan view of FIG. 4) are pivotally connected to the outer link lever 8a and the seat member 15 by pins 9, 10, 13 and 14 forming a trapezoidal swinging linkage as in FIGS. 1 and 2. On end of the seat member 15 which forms the inner or bottom side of the trapezoidal linkage is pivotally connected by a pin 27 to a base plate 28 which is fixedly mounted on the movable frame 26 of the testing machine. The opposing free ends of the seat member 15 and base plate 28 are connected to each other through a camber angle setting mechanism including a pushing bolt 29, pulling bolt 30 and nut 31 and a spherical washer 32. With this camber angle setting mechanism, the seat member 15 is turned about the pin 27 through an arbitrary angle to tilt the tire a corresponding camber angle in addition to the slip angle imparted by the trapezoidal linkage, thus imparting both the slip and camber angles to the tire by a simpler mechanism as compared with the dual mechanism of FIG. 5 employing a pair of trapezoidal linkages in series.

It will be appreciated from the foregoing description that the present invention provides an angle setting mechanism of simple and compact construction, which is capable of turning a tire a desired slip angle by rotation about the center of its tread portion contacting a rotating wheel of a substitutional road to create running conditions as in actual driving operation. More particularly, the tire support shaft is connected to a movable frame of the tire testing machine through a trapezoidal swingable linkage located a distance from an axis which is disposed perpendicular to the rotating wheel and in a position bisected by the axis of the tire support shaft, the trapezoidal linkage having an outer link lever swung back and forth in a direction perpendicular to the axis of the tire support shaft to tilt the latter to and from the center line of the tire thereby imparting desired slip or camber angles in a facilitated manner. The angle setting mechanism of the invention, which is simple and compact in construction, is free of trouble and has high durability.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mechanism for setting slip and/or camber angles in a tire testing machine having a movable frame and a rotating wheel serving a substitutional road, the angle setting mechanism comprising:

a support shaft adapted to support a tire rotatably at the center thereof for contact with the rotating wheel;

a swingable linkage provided between said tire support shaft and the movable frame of said tire testing machine and comprising four trapezoidally connected link levers including a pair of outwardly converging side link levers, an outer link lever having opposite ends thereof pivotably connected to outer converging ends of said side link levers and centrally fixed to an inner end portion of said tire support shaft, and an inner link lever having opposite ends thereof pivotably connected to inner end portions of said side link levers and securely supported on said movable frame of said testing machine; and means for swinging said outer link lever back and forth for tilting said tire support shaft with respect to the surface of said movable frame.

2. A mechanism as set forth in claim 1, said swingable linkage further comprising a pair of said trapezoidally connected link levers in series and in 90 degree shifted positions for tilting said tire support shaft in two directions for tilting the tire at desired slip and camber angle.

3. A mechanism as set forth in claim 1, further comprising a second angle setting mechanism and a base plate disposed on said movable frame of said testing machine wherein said inner link lever has one end thereof pivotably connected to one end of said base plate and another end thereof connected to an opposite end of said base plate through said second angle setting mechanism which is operable for moving said other end of said inner link lever toward and away from said base plate for tilting said tire support shaft in a direction perpendicular to the swinging direction of said first angle setting mechanism.

* * * * *